(12) United States Patent
Smith et al.

(10) Patent No.: US 10,380,800 B2
(45) Date of Patent: Aug. 13, 2019

(54) SYSTEM AND METHOD FOR LINKING AND INTERACTING BETWEEN AUGMENTED REALITY AND VIRTUAL REALITY ENVIRONMENTS

(71) Applicant: Disney Enterprises, Inc., Burbank, CA (US)

(72) Inventors: Tony R. Smith, Sherman Oaks, CA (US); Mark Arana, Agoura Hills, CA (US); Edward Drake, Agoura Hills, CA (US); Alexander C. Chen, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 29 days.

(21) Appl. No.: 15/354,839

(22) Filed: Nov. 17, 2016

(65) Prior Publication Data

US 2017/0301140 A1 Oct. 19, 2017

Related U.S. Application Data

(60) Provisional application No. 62/324,235, filed on Apr. 18, 2016.

(51) Int. Cl.
*G06T 19/00* (2011.01)
*G06T 1/20* (2006.01)
*G02B 27/01* (2006.01)

(52) U.S. Cl.
CPC .............. *G06T 19/006* (2013.01); *G06T 1/20* (2013.01); *G02B 27/017* (2013.01); *G02B 2027/014* (2013.01); *G02B 2027/0138* (2013.01)

(58) Field of Classification Search
CPC ....... G06T 19/006; G06T 1/20; G02B 27/017; G02B 2027/0138; G02B 2027/014
(Continued)

(56) References Cited

U.S. PATENT DOCUMENTS 8,400,548 B2 *   3/2013   Bilbrey ................. G06T 19/006
                                                  348/333.01
2014/0100997 A1 *  4/2014  Mayerle ............. G06Q 30/0643
                                                  705/27.2

(Continued)

OTHER PUBLICATIONS

Tatu Harviainen, U.S. Appl. No. 62/209,193, filed Aug. 24, 2015.*
Rajeev Dutt et al., U.S. Appl. No. 62/187,451, filed Jul. 1, 2015.*

*Primary Examiner* — Chante E Harrison
(74) *Attorney, Agent, or Firm* — Sheppard Mullin Richter & Hampton LLP

(57) ABSTRACT

Systems and methods are described for linking and interacting between augmented reality (AR) and virtual reality (VR) environments. An AR host system may capture or retrieve data associated with an AR view of a first user's real-world environment. The data may include an audio-visual stream of the real-world view, digital object data associated with digital objects overlaid on the real-world view, and other data. The AR host system transmits the data to a VR system. The VR system may place a second user into a VR environment that is a representation of the AR view. The VR system may also generate additional digital object data associated with the AR view and transmit the generated digital object data to the AR host system. The AR host system receives the digital object data and modifies the AR view presented to the first user.

23 Claims, 5 Drawing Sheets

(58) Field of Classification Search
USPC .......................................... 345/630–634, 7, 8
See application file for complete search history.

(56) References Cited

U.S. PATENT DOCUMENTS

| | | | |
|---|---|---|---|
| 2014/0184496 A1* | 7/2014 | Gribetz | G02B 27/017 345/156 |
| 2014/0235311 A1* | 8/2014 | Weising | G09G 5/08 463/14 |
| 2014/0320529 A1* | 10/2014 | Roberts | G06T 19/006 345/633 |
| 2015/0091780 A1* | 4/2015 | Lyren | G06T 19/006 345/8 |
| 2015/0193982 A1* | 7/2015 | Mihelich | H04W 4/026 345/633 |
| 2015/0234462 A1* | 8/2015 | Miller | G06F 3/013 345/8 |
| 2015/0235433 A1* | 8/2015 | Miller | G06T 19/006 345/633 |
| 2015/0235434 A1* | 8/2015 | Miller | G06T 19/006 345/633 |
| 2015/0235610 A1* | 8/2015 | Miller | G09G 5/006 345/633 |
| 2016/0026253 A1* | 1/2016 | Bradski | G02B 27/225 345/8 |
| 2016/0217615 A1* | 7/2016 | Kraver | G06T 19/006 |
| 2016/0291922 A1* | 10/2016 | Montgomerie | G06T 19/006 |
| 2016/0300387 A1* | 10/2016 | Ziman | G06T 19/003 |
| 2017/0004567 A1* | 1/2017 | Dutt | G06Q 30/0643 |
| 2017/0053447 A1* | 2/2017 | Chen | G06T 19/006 |
| 2018/0130259 A1* | 5/2018 | Leefsma | G06F 3/04815 |
| 2018/0286129 A1* | 10/2018 | Harviainen | G06F 3/1423 |

* cited by examiner

SYSTEM AND METHOD FOR LINKING AND INTERACTING BETWEEN AUGMENTED REALITY AND VIRTUAL REALITY ENVIRONMENTS

CROSS-REFERENCE TO RELATED APPLICATIONS

This application claims priority to U.S. Provisional Patent Application No. 62/324,235, filed Apr. 18, 2016.

TECHNICAL FIELD

The present disclosure relates generally to augmented reality and virtual reality environments, and more particularly, to a system and method for linking and interacting between augmented reality and virtual reality environments.

BRIEF SUMMARY OF THE DISCLOSURE

Systems and methods are described for linking and interacting between augmented reality and virtual reality environments.

In a first embodiment, a method implemented by an augmented reality system associated with a first user may include: capturing data of an augmented reality view of a real-world environment; transmitting, to a device associated with a second user, the captured data of the augmented reality view; receiving, from the device associated with the second user, digital object data of a digital object associated with the augmented reality view; and in response to receiving the digital object data, modifying the augmented reality view.

In a further implementation, the method includes: rendering the augmented reality view of the real-world environment, the augmented reality view including digital objects registered with the real-world environment. The augmented reality view may be rendered by displaying one of the digital objects overlaid over the real-world environment. The captured data that is transmitted may include video data of the real-word environment and digital object data associated with the one or more digital objects overlaid over the real-world environment.

The augmented reality system may include a head-mounted display. The head-mounted display may display the digital objects overlaid over the real-world environment and record a field of view using a camera.

In a second embodiment, a method implemented by a virtual reality system associated with a first user may include: receiving video data and digital object data from a second device associated with a second user, where the video data and digital object data are associated with a display of an augmented reality view of a real-world environment; based on the received video data and digital object data, rendering a virtual reality view using the first device; receiving digital object data generated by the first user by physical manipulation of a user input device, the data including digital object data associated with the augmented reality view; and transmitting the digital object data to the second device, where the digital object data modifies the display of the augmented reality view.

In a further implementation, the method includes: receiving video data from a third device associated with a third user, where the video data is associated with a second display of an augmented reality view of the real-world environment; based on the received video data from the second and third devices, creating a three-dimensional representation of the real-world environment; and displaying the three-dimensional representation of the real-world environment.

Other features and aspects of the disclosed method will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments of the disclosure.

The figures are not exhaustive and do not limit the disclosure to the precise form disclosed.

DETAILED DESCRIPTION

In accordance with embodiments of the technology disclosed herein, systems and methods are described for linking and interacting between augmented reality (AR) and virtual reality (VR) environments. In various embodiments, this may be implemented by an AR host system associated with a first user experiencing an environment, and a VR receiver system associated with a second remotely connected user that may allow the second user to interact with the view of the first user. The AR host system includes an AR device for generating an augmented view of a first user's environment, and the VR receiver system includes a VR device permitting the second user to remotely experience the first user's environment and interact with the view of the first user.

As used herein, the term "augmented reality" or "AR" generally refers to a view of a physical, real-world environment that is augmented or supplemented by computer-generated or digital information such as video, sound, and graphics. The digital information is directly registered in the user's physical, real-world environment such that the user may interact with the digital information in real time. The digital information may take the form of images, sound, haptic feedback, video, text, etc. For example, three-dimensional representations of digital objects may be overlaid over the user's view of the real-world environment in real time.

As used herein, the term "virtual reality" or "VR" generally refers to a simulation of a user's presence in an environment, real or imagined, such that the user may interact with it.

Figure 1A:
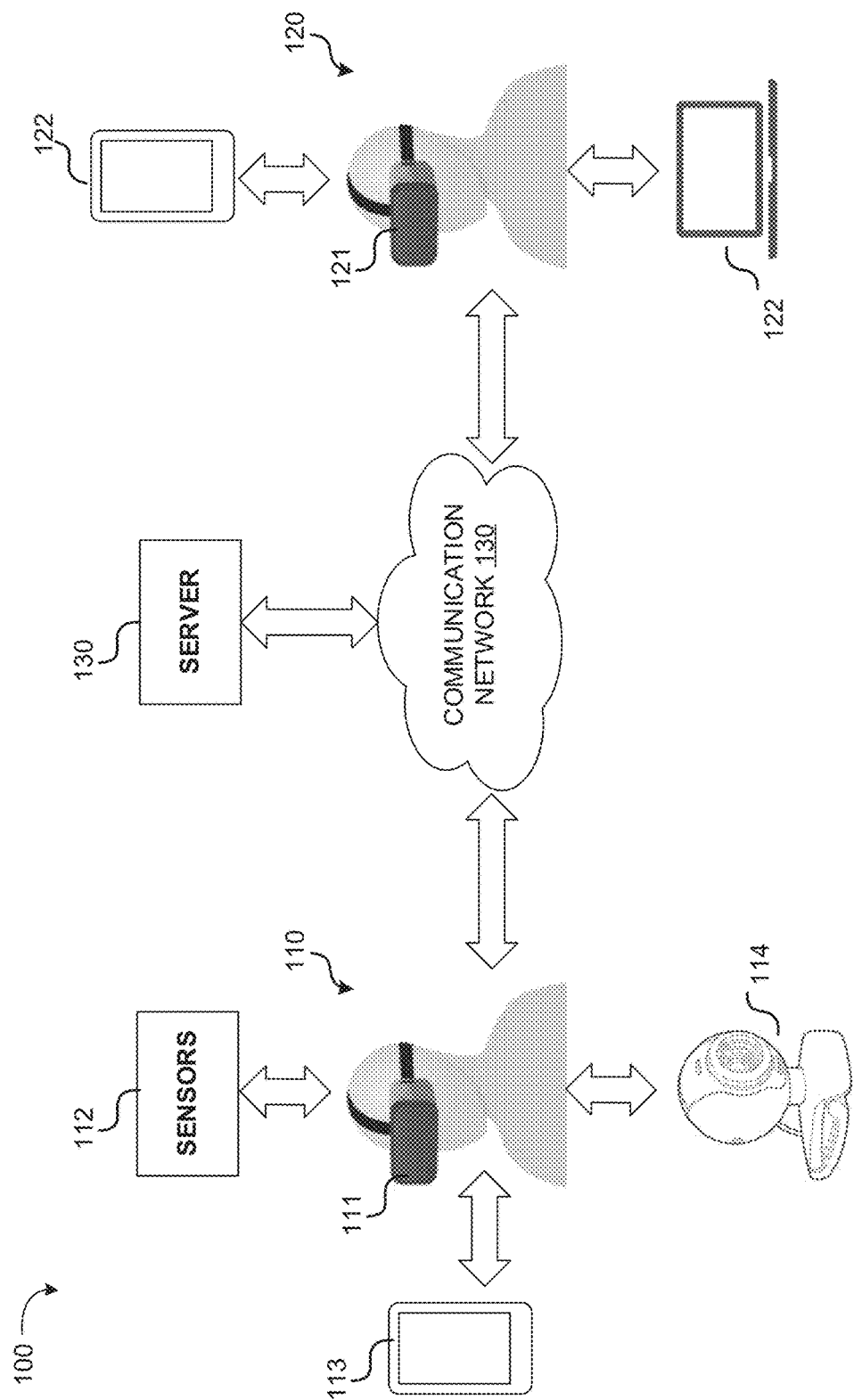
FIG. 1A illustrates a system for linking and interacting between AR and VR environments in accordance with the disclosure.

FIG. 1A illustrates a high-level block diagram of an exemplary system 100 in accordance with the present disclosure. As illustrated, an AR host system 110 associated with a first user (i.e., AR host) communicates over communication network 130 with a VR receiver system 120 associated with a second user (i.e., VR receiver). In some embodiments, multiple AR host systems 110 may be in communication with one or more VR receiver systems 120. Alternatively, one AR host system 110 may be in communication with multiple VR receiver systems 120.

Communication network 130 may comprise any communications network suitable for exchanging data between AR host system 110 and VR system 120.

Some non-limiting examples of protocols over which AR host system 110 and VR receiver system 120 may connect to a network 130 include: cellular telecommunications protocols, such as GSM, UMTS, CDMA2000, LTE, or WiMAX; wired communications methods, such as cable, DSL, dial-up, or fiber-optic; or wireless communications methods, such as satellite communications or Wi-Fi. In one embodiment, AR host system 110 and VR system 120 may communicative over a peer-to-peer network. In some embodiments, a plurality of networking protocols may be utilized to establish communications.

During operation, AR host system 110 may capture and retrieve data associated with an augmented reality view of the AR host of a real-world environment. In various embodiments, the captured and retrieved data may include, for example, an audio-visual feed of the AR host's real-world environment from the perspective of the AR host, digital object data associated with objects that augment the AR host's view of the real-world environment, metadata about the objects and audio-visual feed, and other information. By way of example, the digital object data may include information overlaid on the real-world audio-visual feed, such as 3D graphics (e.g., moving animated characters), selectable markers, sounds, interactive elements, etc. Additionally, the digital object data may include other data that is registered with the real-world environment of the AR user, such as, for example, haptic or olfactory feedback. Other data captured by AR host system 110 may include motion sensor or physiological sensor data (e.g., motion of the user over time, the user's heartrate over time, etc.) and geometry data of the AR host's physical space and the real-world objects in that physical space. For example, an AR head-mounted display (HMD) may have a camera and/or sensors to scan an area of a room.

The captured and retrieved data may be composited or kept in separate data streams. For example, audio data from the audio-visual feed, video data form the audio-visual feed, geometry data from the real-world environment, sensor data, and the different types of digital object data (e.g., 3D graphics, audio, haptic feedback, etc.) may be recorded as separate digital files (or streams) or composited into a single file (or stream). In implementations, the separate digital files may be synchronized using time codes.

In embodiments, an AR device 111 such as a HMD system (e.g., glasses, goggles, helmet, camera, smartphone, etc.) may capture the data. The HMD may comprise a video see-through display or an optical see-through display. In some embodiments, additional equipment such as microphones, omnidirectional cameras 114, sensors 112, and mobile devices 113 (e.g., phones, tablets, wearable devices such as smartwatches, etc.) may assist in any combination of: capturing additional data associated with the environment of the AR host (e.g., additional views of the environment), supplementing the augmented reality view provided to the AR host, processing the captured AR data, or transmitting the captured data to virtual reality system 120 over communication network 130. In various embodiments, the transmitted data may include, for example, an audio-visual stream of the AR host's real-world view, digital object data associated with digital objects overlaid on the augmented reality view of the AR host, and additional data captured by additional devices such as omnidirectional cameras 114 or sensors 112. This data may be transmitted as a single, composited file/stream, or as separate data files/streams.

After VR system 120 receives the data, a VR device 121 (e.g., a HMD, omnidirectional projector, etc.) of VR receiver system 120 may place a user (VR receiver) into a virtual reality environment, which is a representation of the augmented reality view of the AR host. For example, the VR receiver system 120 may recreate the sender's experience by providing a view the audio-visual feed of the AR host in real-time along with the overlaid digital objects corresponding to the augmented reality view. In embodiments, the data received from sensors 112 may be used to compensate for any head motion by the AR host.

As another example, a modified view of the environment of the AR host may be created. For example, after receiving composite elements associated with the AR host's environment, the VR receiver system 120 may recreate real geometry from the sender's environment, enhance the geometry with additional digital object data, and display the enhanced environment to the user of the VR receiver system 120.

In some embodiments, the VR receiver is not capable of providing feedback to the AR host, or the AR host does not allow the VR receiver to provide feedback, i.e., the VR receiver is passive. For example, a famous person can be the AR host doing an activity (e.g., cooking, rock climbing, mixed martial arts fighting), and thousands of people can each have a VR receiver to experience the activity and environment of the AR host.

In other embodiments, the AR host allows the VR receiver to provide feedback (i.e., the VR receiver is active), the VR receiver may communicate with the AR host about the VR receiver's observations about the AR host's environment, including observations about the audiovisual feed of the AR host and observations about data captured by additional equipment (e.g., omnidirectional cameras 114, sensors 112, etc.). Communication may be audio-based (e.g., using a microphone), haptic-based (e.g., the VR receiver may activate haptic feedback sensors on the AR host to capture their attention), or by way of visual cues, further described below. For instance, based on what the omnidirectional camera 114 captures, the VR receiver may direct the AR host to look in another direction from the AR host's own current view.

The VR receiver may interact with and influence the AR environment of the AR host by actuating a user input device (e.g., VR device 121, mobile devices 122, or other devices) and generating data that is transmitted back to AR host system 110. For example, the VR receiver may generate new digital objects that are displayed in the augmented reality view of the AR host or manipulate digital objects that are currently displayed in the augmented reality view. In an application of this example, a VR receiver may highlight an object for the AR host's attention by manipulating a touch screen or other hand controller of a mobile device 122. In another application of this example, the VR receiver may generate and/or send images, video and other content (live or recorded) to the AR host.

As another example, a VR receiver may rewind or stop the audio-visual feed of the AR host and play it back at different speeds (e.g., slow motion) to review specific details. In another example, the VR receiver may zoom in and out of the AR host environment using omnidirectional camera 114. For example, if the AR host is looking at a door of a building, the VR receiver may use a controller to zoom out and see the rest of the building and objects around the building. The view of the AR host may be highlighted with a yellow oval, so that the VR receiver can "snap back" to the view of the AR host at any time. The VR receiver may then recommend that the AR host step back, turn their head left, right, up or down, move an object in the scene, or say something to a person. Accordingly, as would be appreciated by one having skill in the art, system 100 in various implementations permits two remotely connected users to experience and interact with the same augmented real-world environment.

The VR system 120 may communicate with a server that has software and/or processors to recognize objects being viewed by the AR device 111 and retrieve information on the Internet about those objects.

In implementations, a server 130 (e.g., a cloud based application server) may process data gathered by AR host system 110 or data received by VR receiver system 120. For example, server 130 may create an enhanced audio-visual feed for display to VR receiver system 120 based on the data received from AR host system 110. As another example, server 130 may compute the shape, texture, mesh, or other parameters of three-dimensional digital objects that are captured and displayed using a HMD worn by an AR host. As a further example, server 130 may composite and synchronize separate data streams received from AR host system 110 to present the AR experience. The server 130 may store in a memory (volatile or non-volatile) data gathered by AR host system 110 and data generated by VR receiver system 120. Alternatively, in other embodiments, AR host system 110 or VR receiver system 120 may locally process all data for presenting the AR or VR experience.

Figure 1B:
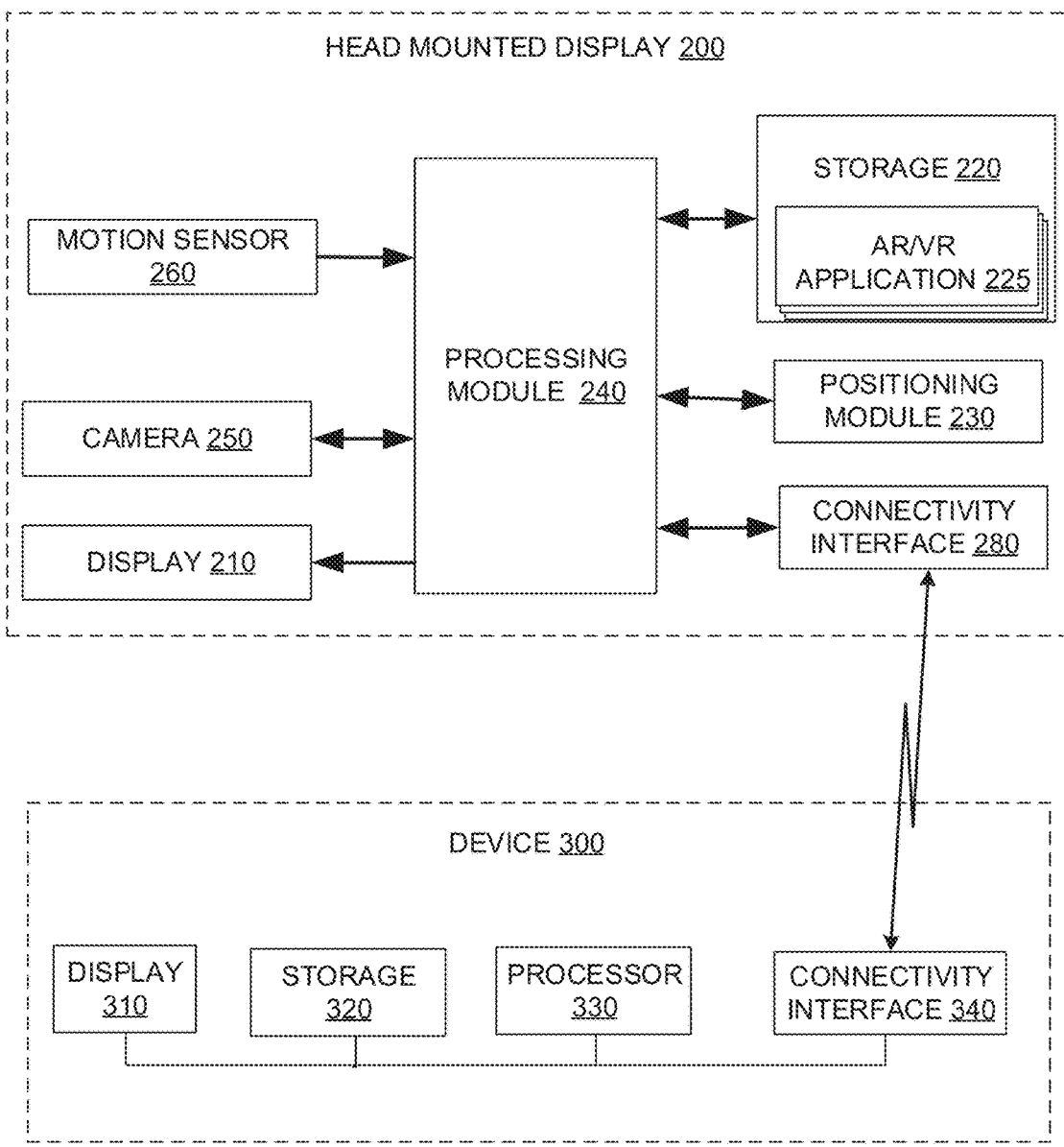
FIG. 1B is a block diagram illustrating an example architecture for components of an augmented reality or virtual reality device in accordance with the disclosure.

FIG. 1B is a block diagram illustrating an example architecture for components of an AR or VR HMD 200 that may be used in an implementation. As illustrated in this example, HMD 200 is in communication with a device 300 (e.g., a local mobile device or server) that may offload data processing tasks, gather additional data associated with an AR/VR presentation, or otherwise assist with presenting an AR/VR view.

HMD 200, in various embodiments, is any head-mounted display system (e.g., glasses, goggles, a visor, helmets, smartphone, etc.) that may generate an AR view of a user's real world environment (e.g., by displaying digital objects overlaid over the real world environment) and/or a VR view of another user's real-world environment. HMD 200 may comprise a display 210, storage 220, positioning module 230, processing module 240, camera 250, motion sensor 260, and connectivity interface 280. HMD 200 may be tethered or untethered.

In implementations, display 210 may be an AR display such as an optical see-through display (e.g., a transparent OLED or LED screen that uses a waveguide to display the digital objects overlaid over the real-world environment) or video see-through display that supplements video of the user's real world environment with overlaid digital objects. Alternatively, display 210 may be a VR video display that is not see-through.

Storage 220 may comprise volatile memory (e.g. RAM), non-volatile memory (e.g. flash storage), or some combination thereof. In various embodiments, storage 220 stores an AR or VR application 225, that when executed by processing module 240 (e.g., a digital signal processor), generates an AR view or VR view on display 210. The view generated on display 210 may display one or more overlaid digital objects and it may be used to place one or more digital objects. Additionally, storage 220 may store digital object information and AR data streams.

Positioning module 230 may comprise one or more devices for retrieving positional information over a network. For example, positioning module 230 may include a global positioning system receiver, a cellular receiver, a network interface card, an altimeter, or some combination thereof. The positional information retrieved by module 230 may be processed by processing module 240 to determine the geographical coordinates of HMD 200. For example, application software installed in storage 220 may use the location of HMD 200 from a GPS reading along with a map of declination (e.g., stored or retrieved from a network) to determine the geographical coordinates of headset 200.

In AR HMD implementations, camera 250 may capture a video stream of the real world environment such that AR software 225 may overlay digital objects over the real world environment to create an AR environment. For example, in embodiments where display 210 is a video display, the digital video stream captured by camera is overlaid with digital objects. In embodiments, camera 250 is an omnidirectional camera. There may be more than one camera 250 in more than one direction.

Motion sensor 260 receives or generates electronic input signals representative of the motion/position of HMD 200. These electronic input signals may be received and processed by circuitry of processing module 240 to determine the motion of a user of HMD 200 and an absolute orientation of HMD 200 in the north-east-south-west (NESW) and up-down planes. Processing module 240 may store this orientation information in storage 220. In various embodiments, position sensor 260 may comprise one or more gyroscopes, accelerometers, and magnetometers.

Connectivity interface 280 may connect AR headset 200 to device 300 through a communication medium. The medium may comprise a wireless network system such as a BLUETOOTH system, a ZIGBEE system, an Infrared (IR) system, a Radio Frequency (RF) system, a wireless local area network, or the like. In further embodiments, connectivity interface 280 may connect AR headset system to the Internet using a cellular network, a satellite network, a local area network, or some combination thereof.

Device 300 may comprise a display 310, storage 320, processor 330, and connectivity interface 340 that communicatively couples device 300 to AR headset 200. In embodiments, device 300 can be any device (e.g. a smartphone, a tablet, a laptop, game console, desktop computer, or a network of computers and/or servers, or a wearable device such as a smartwatch) that may supplement HMD 200 in processes such as generating digital objects for display in an AR or VR environment, generating an AR or VR audiovisual feed, storing digital object information, processing motion sensor data, etc. For example, device 300 may be a cloud-based application server that processes information received from AR/VR HMD 300 and returns media information that may be rendered by AR/VR HMD to provide an AR/VR view. In one embodiment, storage 320 stores a cloud-based AR/VR application, that when executed by processor 330, processes the information received from AR/VR HMD 300.

Figure 2:
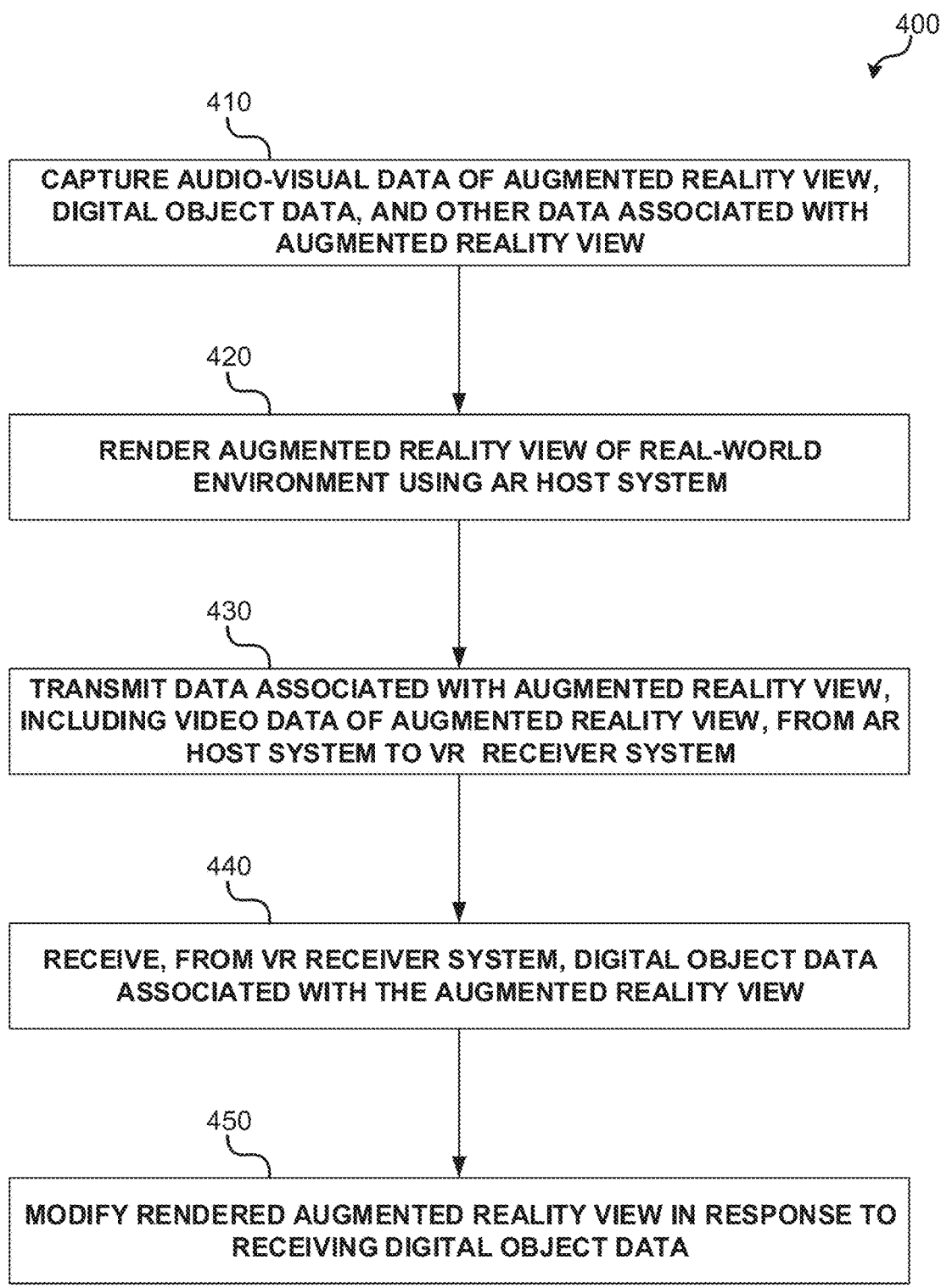
FIG. 2 is an operational flow diagram illustrating an example method that may be implemented using the augmented reality host system of FIG. 1A.

FIG. 2 is an operational flow diagram illustrating an example method 400 that may be implemented using the AR host system 110 of FIG. 1A. For example, method 400 may be implemented using a HMD worn by a user of system 110.

Operations 410 and 420 may be performed as shown, in a different order, or concurrently.

At operation 410, data of an AR view is captured or retrieved. The captured data or retrieved data may include audio-visual data of the AR view captured by one or more cameras or microphones (e.g., a camera integrated in a HMD), digital object data, sensor data (e.g., motion sensor data gathered by a HMD, physiological sensor data gathered by a wearable device, etc.), geometry data of the real physical environment, and other data associated with the AR view. The data may be captured as separate data streams. For example, audio data from the audio-visual feed, video data form the audio-visual feed, geometry data from the real-world environment, sensor data, and the different types of digital object data (e.g., 3D graphics, audio, haptic feedback, etc.) may be recorded as separate digital files or streamed as separate streams. All or a subset of the captured data may be cached or stored in a memory communicatively coupled to AR host system 110. For example, the captured data may be stored in a memory of mobile device 113 or server 130.

At operation 420, an AR view of the user's real-world environment is rendered using AR host system 110. The AR view may be rendered using the captured and retrieved data. For example, one or more digital objects may be displayed overlaid over the user's real-world environment on a video see-through or optical see-through HMD. By way of example, the digital objects may include 3D graphics (e.g., moving animated characters), selectable markers, sounds, interactive elements, haptic feedback, olfactory feedback, and other data that is registered with the real-world environment of the AR user. The rendering and processing of data associated with the AR view may be distributed over multiple devices (e.g., a HMD 111, a smartphone 113, a server 130, etc.) or done by a single device (e.g., a HMD 111).

The digital objects may be manually or automatically created by executing an AR application 225 stored on a HMD or mobile device. Execution of the AR application 225 may display a GUI that permits a user to select, create, and/or register digital objects in the user's real-world environment. For example, in the case of visual digital objects, a user may select a digital object's general shape, size, orientation, texture, and color. As another example, a user may associate sounds with particular locations or visual objects. In a particular implementation, the user may retrieve digital object template information over a network using the AR application.

At operation 430, the captured data associated with the rendered AR view is transmitted over a communication network to a VR receiver system 120 associated with a second user. Prior to transmission, some or all of the captured data may be composited. For example, an audio data stream, a visual data stream, and digital object data stream may be synchronized in time (e.g., using time codes) and composited into a single file (or an audiovisual stream) that is transmitted over the network for playback by VR receiver system 120. In another implementation, the VR receiver system 120 may separately receive each of the data streams over the network, including synchronization information (e.g., time codes) for each of the data streams. In yet another implementation, a server 130 may synchronize and composite the separate data streams and make them available to the VR receiver system 120. In yet another implementation, some of the data streams may be composited, whereas other data streams may be kept separate. For example, data streams that are not modified by the VR receiver system (e.g., audiovisual feed or AR physical environment) may be composited, whereas data streams that may be modified by the VR received system (e.g., digital object data) may be received separately.

At operation 440, digital object data associated with the AR view is received from the VR receiver system 120 over the communication network. For example, the VR receiver system 120 may have generated new digital objects for display in the augmented reality view of the AR host system 110 or may have manipulated digital objects using the digital object data received from the AR host system 110. By way of example, the digital object data received from the VR receiver system 120 may comprise digital markers to accentuate a location or object in the field of view in a HMD of the AR host system 110, an interaction with an existing digital character that changes its state, or other digital object data.

At operation 450, AR host system 110 modifies the rendered AR view in response to receiving the digital object data from VR receiver system 120. For example, additional digital objects such as graphics, sounds, and haptic feedback may be registered in the user's real-world environment.

Figure 3:
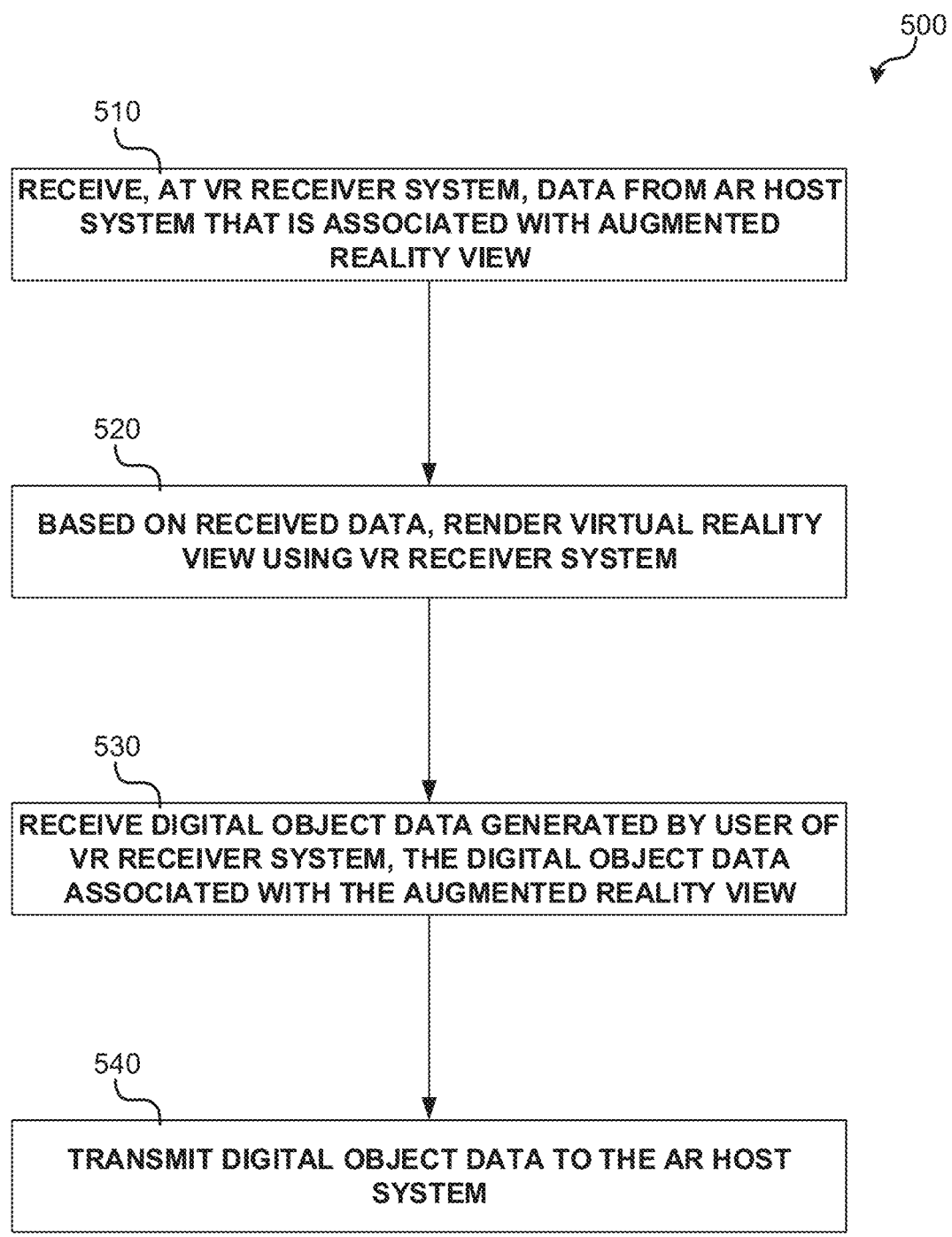
FIG. 3 is an operational flow diagram illustrating an example method that may be implemented using the virtual reality receiver system of FIG. 1A.

FIG. 3 is an operational flow diagram illustrating an example method 500 that may be implemented using the VR receiver system 120 of FIG. 1A. At operation 510, data associated with an AR view is received at a VR receiver system 120 from an AR host system 110 over a communication network. The data may include audio-visual data of an AR view captured by one or more cameras or microphones of an AR device, digital object data, sensor data, geometry data of the real physical environment, and other data associated with the AR view. Each of the different types of data may be received as separate data streams, a composite data stream, or some combination thereof. For example, the audiovisual feed of the AR user's physical environment may be a composite of audio and video that is received separately from the digital object data.

At operation 520, a VR view is rendered on a device of the VR receiver system 120. For example, an audio-visual feed, including overlaid digital object data, may be displayed to a user using a HMD, a projector, or a smart television. As another example, the VR receiver system 120 may recreate real geometry from the sender's environment using received geometry data, enhance the geometry with additional digital object data, and display the enhanced environment to the user of the VR receiver system 120. In implementations, a server 130 may process the data prior to it being rendered by VR receiver system 120.

At operation 530, a user of the VR device may generate digital object data to be associated with the AR view. The state of existing digital objects may be changed or new digital objects may be registered with environment. By way of example, a user of a VR receiver may highlight an object for the AR host's attention by manipulating a touch screen or other hand controller of a mobile device 122. At operation 540, the generated digital object data is transmitted to the AR host system 110 over a communication network.

Example settings in which this disclosed system may be implemented are now described. In a first example, the disclosed system may be implemented to provide a joint theme park experience between an AR host physically present at the theme park and a VR receiver at another location (e.g., in the park or outside the park). In this example setting, the AR host may wear an AR headset that displays a digital character overlaid on the theme park environment. The overlaid digital character may provide a custom tour of the theme park. The VR receiver may experience the same tour through the eyes of the user of the AR headset and interact with the digital character.

In a second example setting, the disclosed system may enhance movie production and direction. For example, directors, camera operators, and producers locally present at the filming of a scene may each wear an AR headset display that enables viewing of a live scene in multiple resolutions, colors, angles, formats, etc. These viewings may be shared among the local AR users and transmitted to a remote VR receiver, which can provide feedback (e.g., music, video enhancements, video clips, scenes) to the AR users. As another example, pre-mapped environments may be generated during video filming or production. A VR receiver or AR user may selectively add digital objects into an AR view experienced by another AR user. In this manner, the environment may be virtually green screened.

In a third example setting, the disclosed system may provide athletic coordination between a coach and assistant coaches. For example, the assistant coaches may act as AR hosts that provide multiple views and information about an ongoing football game. The coach, acting as a VR receiver, may receive this information and instruct the assistant coaches, for example, by generating digital objects (e.g., play calls) that may be overlaid into the augmented views of the assistant coaches. The VR receiver can receive multiple views from multiple AR hosts and select one of the views to zoom in.

In a fourth example setting, the disclosed system may provide a shared transactional experience for buyers of goods or services. For example, an AR host browsing merchandise at a store may transmit a video feed layered with AR information regarding the merchandise to a VR receiver. In some implementations, the AR information may display a price and description of a viewed item. The user of the VR receiver may authorize or select items for purchase via a GUI. Additionally, the user of the VR receiver may purchase the items, by, for example, transmitting encrypted token information to the AR device for use at a payment terminal or by directly transmitting token information to a transaction system that confirms purchase with the merchant at the store where the user of the AR device is present.

In a fifth example setting, the disclosed system may enable an AR host to present content to multiple users with VR receivers. For example, an augmented point of view of an actor, participant on a television program, or other person of interest may be broadcast to multiple VR users. For instance, consider a game show participant, wearing an AR device, who is presented with a set of choices that are digitally registered to the user's environment. A video feed of this AR view is made available to multiple users with VR receivers. The users of the VR receivers may each select a choice, and this information may be transmitted back to the AR host, thereby providing a majority vote with which the AR host may make a decision.

Other example settings in which the disclosed system may be implemented include crime scene investigation (e.g., lab technicians remotely coordinating with personnel at the scene of a crime), medical treatment (e.g., doctor acting as a VR user that gives instructions to AR users). As would be appreciated by one having skill in the art, the disclosed technology may be implemented in any setting in which it is desirable for two users to jointly interact with and experience the augmented reality environment of one of the users.

In another embodiment of the disclosed technology, a VR receiver system 120 may generate a three-dimensional representation of a real-world environment based on a plurality of audio-visual feeds received from AR hosts with different viewing angles of the same real-world environment. For example, the audio-visual feeds may be temporally synched and spatially reconstructed using 3D reconstruction algorithms known in the art.

In a further embodiment of the disclosed technology, different levels of permissions may be provided to a plurality of VR receivers that interact with one or more AR hosts. For example, depending on the viewer, permissions may be set such that the VR receiver may 1) only view (passive), 2) partially interact with (e.g., add some digital elements), or 3) fully interact with the environment of the AR host (active).

In yet another embodiment of the disclosed technology, each of the AR host system 110 and VR system 120 may serve the dual role of AR and VR system. For example, AR device 110 may be configured to provide an augmented reality view of the user's environment or a virtual reality view of another user's environment. Likewise, VR device 120 may be switched between these two functions.

Figure 4:
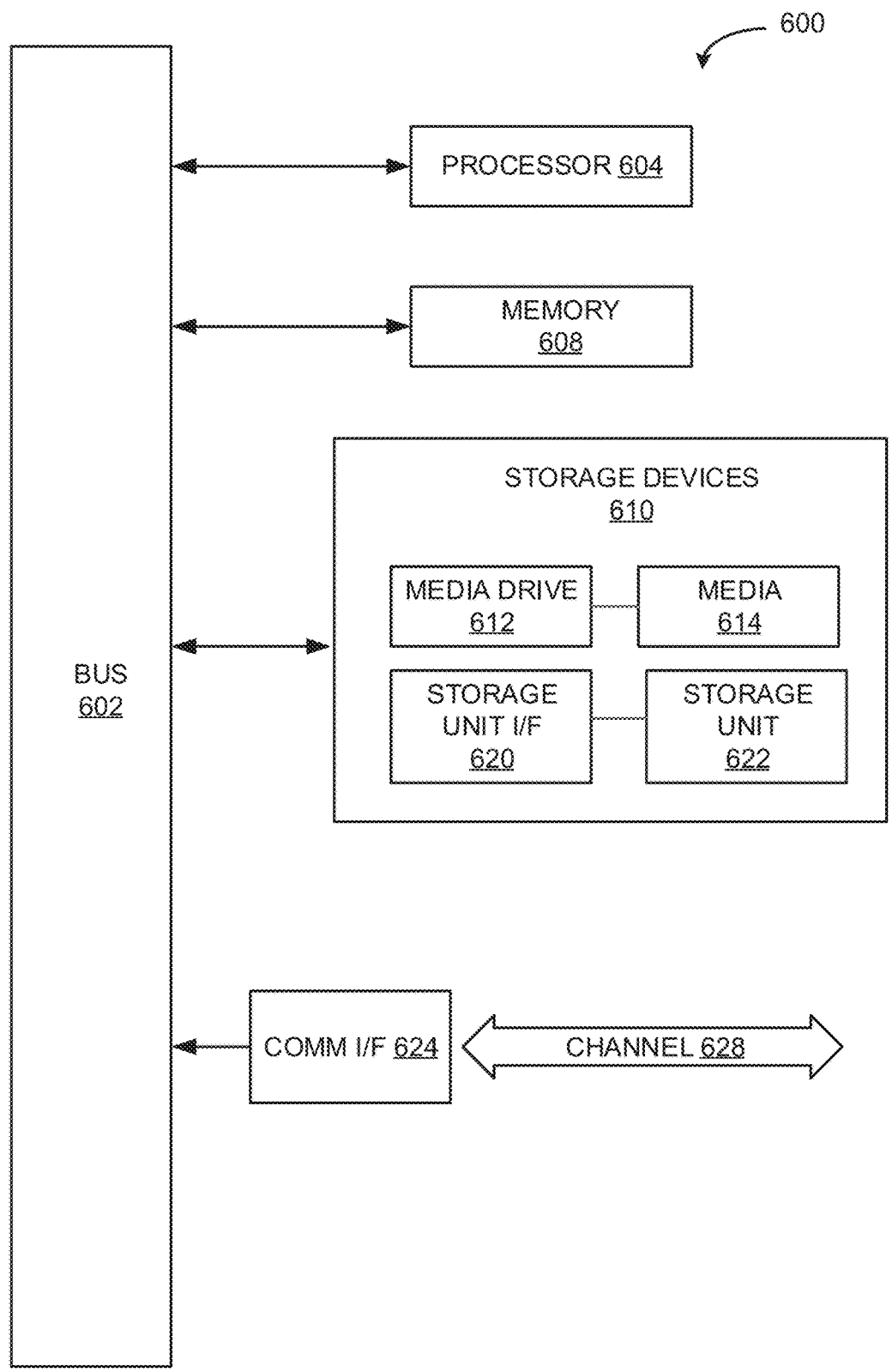
FIG. 4 illustrates an example computing module that may be used to implement various features of the methods disclosed herein.

FIG. 4 illustrates an example computing module that may be used to implement various features of the methods disclosed herein.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 4. Various embodiments are described in terms of this example-computing module 600. After reading this description, it will become apparent to a person skilled in the relevant art how to implement the application using other computing modules or architectures.

Referring now to FIG. 4, computing module 600 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 600 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 600 might include, for example, one or more processors, controllers, control modules, or other processing devices, such as a processor 604. Processor 604 might be implemented using a general-purpose or special-purpose processing engine such as, for example, a microprocessor, controller, or other control logic. In the illustrated example, processor 604 is connected to a bus 602, although any communication medium can be used to facilitate interaction with other components of computing module 600 or to communicate externally.

Computing module 600 might also include one or more memory modules, simply referred to herein as main memory 608. For example, preferably random access memory (RAM) or other dynamic memory, might be used for storing information and instructions to be executed by processor 604. Main memory 608 might also be used for storing temporary variables or other intermediate information during execution of instructions to be executed by processor 604. Computing module 600 might likewise include a read only memory ("ROM") or other static storage device coupled to bus 602 for storing static information and instructions for processor 604.

The computing module 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid state drive, a magnetic tape drive, an optical disk drive, a CD or DVD drive (R or RW), or other removable or fixed media drive might be provided. Accordingly, storage media 614 might include, for example, a hard disk, a solid state drive, magnetic tape, cartridge, optical disk, a CD, DVD, or Blu-ray, or other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing module 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory module) and memory slot, a PCMCIA slot and card, and other fixed or removable storage units 622 and interfaces 620 that allow software and data to be transferred from the storage unit 622 to computing module 600.

Computing module 600 might also include a communications interface 624. Communications interface 624 might be used to allow software and data to be transferred between computing module 600 and external devices. Examples of communications interface 624 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 624 might typically be carried on signals, which can be electronic, electromagnetic (which includes optical) or other signals capable of being exchanged by a given communications interface 624. These signals might be provided to communications interface 624 via a channel 628. This channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer readable medium", "computer usable medium" and "computer program medium" are used to generally refer to non-transitory media, volatile or non-volatile, such as, for example, memory 608, storage unit 622, and media 614. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 600 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

What is claimed is:

1. A method, comprising:
  capturing data of an augmented reality view of a real-world environment using an augmented reality system associated with a first user, wherein the captured data comprises video data of the real-word environment and graphical digital object data comprising a graphical digital object overlaid over the real-world environment;
  transmitting, from the augmented reality system to a device associated with a second user, the video data and the graphical digital object data of the augmented reality view, wherein the video data and the graphical digital object data are transmitted as separate data streams;
  after transmitting the video data and the graphical digital object data, receiving, from the device associated with the second user, digital object data modifying a state of the graphical digital object; and
  in response to receiving the digital object data modifying the state of the graphical digital object, the augmented reality system modifying the augmented reality view.

2. The method of claim 1, further comprising: rendering the augmented reality view of the real-world environment using the augmented reality system, the augmented reality view comprising the graphical digital object registered with the real-world environment.

3. The method of claim 2, wherein rendering the augmented reality view comprises displaying the graphical digital object overlaid over the real-world environment.

4. The method of claim 3, wherein the augmented reality system comprises a head-mounted display for displaying digital objects overlaid over the real-world environment.

5. The method of claim 4, wherein capturing data of the rendered augmented reality view comprises a camera of the head-mounted display recording a field of view of the head mounted display.

6. The method of claim 3, wherein modifying the rendered augmented reality view comprises modifying the display of the graphical digital object overlaid over the real-world environment.

7. The method of claim 3, further comprising:
  transmitting, from the augmented reality system to a second device associated with a third user, the video data and the graphical digital object data of the rendered augmented reality view;
  receiving, from the second device associated with the third user, digital object data of a digital object associated with the augmented reality view; and
  in response to receiving the digital object data from the second device, the augmented reality system modifying the rendered augmented reality view.

8. The method of claim 3, further comprising:
  the augmented reality system capturing additional data about the real-world environment using a sensor or omnidirectional camera; and
  transmitting the additional data to a device associated with the second user.

9. The method of claim 3, wherein the graphical digital object comprises a digital character overlaid over the real-world environment, wherein the digital character provides a tour of the real-world environment, wherein the digital object data modifying the state of the graphical digital object comprises an interaction with the digital character that changes the state of the character.

10. The method of claim 3, wherein the real-world environment comprises a store, wherein the graphical digital object comprises a price and description of an item in the store, wherein the digital object data modifying the state of the graphical digital object comprises a selection of the item for purchase.

11. The method of claim 10, further comprising: the AR system receiving encrypted token information from the second user to purchase the item.

12. The method of claim 3, wherein the graphical digital object comprises a set of choices, wherein the digital object data modifying the state of the graphical digital object comprises a selection of one of the choices from the set of choices.

13. The method of claim 1, further comprising: transmitting synchronization information for each of the data streams to the device associated with the second user, wherein the device associated with the second user uses the synchronization information to synchronize the video data stream and the graphical digital object data stream.

14. The method of claim 1, wherein the captured data of the augmented reality view further comprises geometry data of the real-world environment, the method further comprising:
- transmitting, from the augmented reality system to the device associated with a second user, the geometry data as a separate data stream; and
- a device of the second user using at least the transmitted geometry data to recreate real geometry from the real-world environment and enhance the geometry with additional digital object data.

15. An augmented reality system, comprising:
- a processor;
- a non-transitory computer-readable medium operatively coupled to the processor and having instructions stored thereon that, when executed by the processor cause the system to:
  - render an augmented reality view of a real-world environment, the augmented reality view comprising a graphical digital object registered with the real-world environment;
  - capture data of the rendered augmented reality view, wherein the captured data comprises video data of the real-word environment and graphical digital object data comprising the graphical digital object;
  - transmit, to a device associated with a second user, the video data and the graphical digital object data of the rendered augmented reality view, wherein the video data and the graphical digital object data are transmitted as separate data streams;
  - after transmitting the video data and the graphical digital object data, receive, from the device associated with the second user, digital object data modifying a state of the graphical digital object; and
  - in response to receiving the digital object data modifying the state of the graphical digital object, modify the rendered augmented reality view.

16. The system of claim 15, further comprising: a head-mounted display, wherein rendering the augmented reality view comprises using the head-mounted display to display the graphical digital object overlaid over the real-world environment.

17. The system of claim 16, wherein capturing data of the rendered augmented reality view comprises a camera of the head-mounted display recording a field of view of the head mounted display.

18. The system of claim 16, wherein modifying the rendered augmented reality view comprises modifying the display of the graphical digital object overlaid over the real-world environment.

19. The system of claim 16, wherein the instructions, when executed by the processor, further cause the system to:
- transmit, to a second device associated with a third user, the video data and the graphical digital object data of the rendered augmented reality view;
- receive, from the second device associated with the third user, digital object data of a digital object associated with the augmented reality view; and
- in response to receiving the digital object data from the second device, modify the rendered augmented reality view.

20. The system of claim 16 wherein the head-mounted display comprises the processor and non-transitory computer-readable medium.

21. A method, comprising:
- receiving, at a first device associated with a first user, video data and digital object data from a second device associated with a second user, wherein the video data and digital object data are associated with a display of an augmented reality view of a real-world environment having a first viewing angle;
- based on the received video data and digital object data, rendering a virtual reality view using the first device;
- receiving digital object data generated by the first user by physical manipulation of a user input device, the data comprising digital object data associated with the augmented reality view;
- wherein the video data and digital object data are received as separate data streams, the digital object data comprising a graphical digital object that is overlaid over the video, and wherein receiving digital object data generated by the first user by physical manipulation of a user input device comprises the user selecting the graphical digital object;
- transmitting the digital object data to the second device, wherein the digital object data modifies the display of the augmented reality view;
- receiving, at the first device, video data from a third device associated with a third user, wherein the video data is associated with a second display of an augmented reality view of the real-world environment having a second viewing angle; and
- temporally synching and spatially reconstructing, at the first device, the video data received from the second device with the video data received from the third device to create a three-dimensional representation of the real-world environment.

22. The method of claim 21, further comprising: displaying the three-dimensional representation of the real-world environment using the virtual reality device.

23. The method of claim 21, wherein the first device is a head-mounted display.

* * * * *